MANUALLY OPERABLE SWITCH FOR AUTOMATIC TELEPHONE SYSTEM

Filed Oct. 26, 1954 3 Sheets-Sheet 1

INVENTOR.
Dorsey D. Simmons,
BY
Attys.

Dec. 16, 1958 D. D. SIMMONS 2,864,900

MANUALLY OPERABLE SWITCH FOR AUTOMATIC TELEPHONE SYSTEM

Filed Oct. 26, 1954 3 Sheets-Sheet 2

INVENTOR.
Dorsey D. Simmons,
BY Brown, Jackson, Boettcher & Dienner Atty's.

SWITCH PILEUPS FOR USE WITH SELECTOR CKT.

SWITCH CONTACTS CONNECTED IN SELECTOR CKT.

SWITCH PILEUPS FOR USE WITH CONNECTOR CKT.

SWITCH CONTACTS

INVENTOR.
DORSEY D. SIMMONS
BY Brown, Jackson, Boettcher & Dienner
ATTYS.

United States Patent Office 2,864,900

Patented Dec. 16, 1958

2,864,900

MANUALLY OPERABLE SWITCH FOR AUTOMATIC TELEPHONE SYSTEM

Dorsey D. Simmons, Galion, Ohio, assignor to North Electric Company, a corporation of Ohio Application October 26, 1954, Serial No. 464,745

9 Claims. (Cl. 179—158)

This invention relates to manual switches for particular use in telephone systems and the like.

More specifically, this invention relates to manual plural position selector switches mountable in a relay space for a telephone exchange system.

Briefly, the switches of this invention are arranged for use in telephone link circuits, control circuits and trunk circuits where their use provides means for physically conditioning the particular link, control, or trunk for a variety of operational conditions and simulated conditions. A basic fundamental in the switch of my invention lies in the use of a conventional relay frame and a conventional type relay pile-up contact system as the basis for a manually operable switch. The core, armature, and winding of the relay which are normally associated with the relay frame are omitted and actuation of the contact pile-ups is effected by means of a roller member which is manually movable against the various pile-up contact assemblies to cause associated contacts of the particular engaged pile-up to be simultaneously operated. The roller is connected with a manually operable handle or lever system which is pivotally mounted at one end remote from the roller and is accompanied by mechanical locking means for holding the manually operated lever in various selected operating positions.

Of particular advantage in the use of a switch of this invention, is the concentration of considerable switching capacity and versatility in an extremely small spacing. Another outstanding advantage found in my improved switch lies in the avoidance of long connecting wires which would ordinarily be necessary if separate switches for the various links, controls, or trunks were mounted on a common panel. While manual switches mounted with telephone link, control or trunk circuits have been known before, switches of the character of my invention demonstrating as great versatility of operation have not been known previously to applicant.

The main object of this invention is to provide a new and improved manually operable selector switch for use in telephone systems and the like.

Another object of this invention is to provide a new and improved manually operable plural position selector switch which is mountable in a relay space of a telephone system.

A further object of this invention is to to adapt a conventional relay frame and relay-type of multiple pile-up contact assembly for use as a manually operable selector switch.

A still further object of this invention is to provide a new and improved manually operable multiple position selector switch for telephone exchange systems and the like which embodies principles of operation and construction leading to improved characteristics of versatility and compactness.

Still another object of this invention is to provide a new and improved relay-type switch employing pile-up contact assemblies and a means for manually operating such pile-ups one by one as selected by the operator.

The above and further objects, features and advantages of this invention will be recognized by those familiar with the art from the following description of the details and specifications for two forms of improved devices embodying the principles of my invention as shown in the accompanying drawings.

Figures 1, 2, 3, 4:
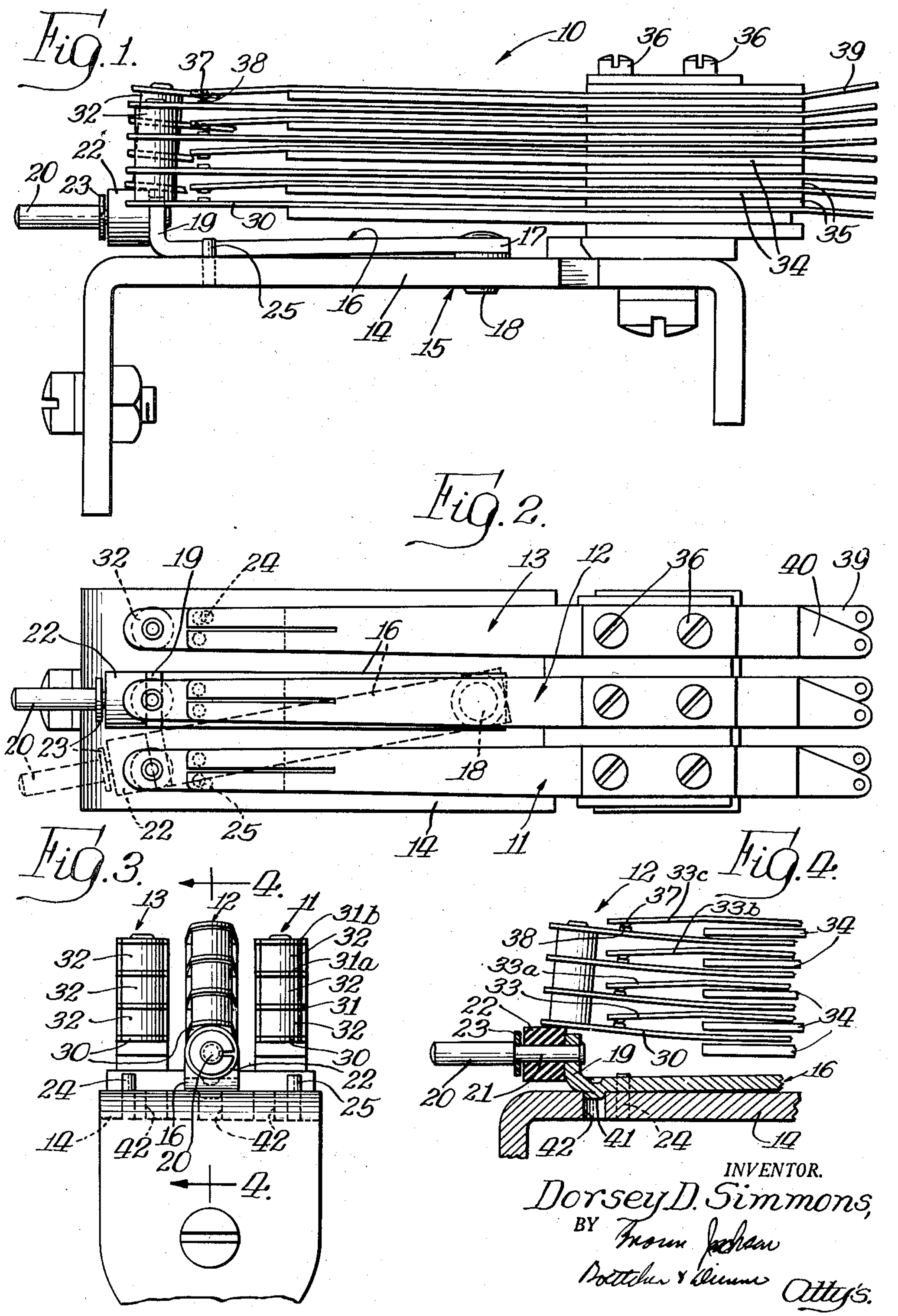
Figure 1 is a side elevational showing of a three pile-up switch assembly embodying the features and concepts of this invention.
Figure 2 is a top plan view of the Figure 1 device.
Figure 3 is an end elevational view looking at the left hand end of the switch assembly as shown in Figure 1.
Figure 4 is a partial cross-sectional view taken substantially at line 4—4 of Figure 3 to illustrate particularly the details of the manual operating means for my improved switch of Figure 1.

Figures *9a* and *9b* illustrate schematically the manner in which the manually operable switch is connected for use with a selector switch; and Figures *10a* and *10b* illustrate the manner in which the manually operable switch is connected for use with a connector switch.

Upon inspection of Figures 1 through 4 of the drawings, the features of a preferred form of my improved switch will be recognized. Basically, this preferred embodiment depicts a manually operable switch 10 having three conventional contact pile-up assemblies 11, 12 and 13 which are mounted in side-by-side relationship on top of a platform portion 14 of a conventional relay frame member 15. It will be seen that the conventional core, armature and winding of a relay system normally associated with a relay pile-up means and frame of the general class shown have been eliminated from my improved device. Located beneath the pile-ups and between the same and the platform portion 14, is an elongated operating bar 16 having a cylindrical aperture formed therethrough adjacent its innermost end 17. A rivet member 18 of lesser diameter than the aperture formed in the operating bar, passes through such bar and into a registering aperture formed in the platform portion 14 of the frame member to form and provide a pivot axis for the operating bar 16. The outer end of the operating bar is upturned, as at portion 19, which is provided with a central opening for receiving one end of a cylindrical handle member 20. A portion 21 of the handle member 20 passes into the upturned portion 19 and is riveted over to form a rigid connection therewith. Portion 21 is reduced in diameter for a distance from the upturned portion 19 sufficient to provide an axle for a rotatable roller member 22 made of insulating material. The roller member is given end bearing support by the presence of the upturned portion 19 at one end and a spring-over washer 23 at its opposite end.

The roller is so positioned that it passes under and serves to lift the various pile-up assemblies as the operating bar 16 and handle 20 are manually swung between horizontal position limits determined by pin members 24 and 25 extending from the upper face of the platform portion of the frame member. It will be understood that the roller 22 passes under and engages lower lever springs 30 of the pile-up assemblies 11, 12 and 13, raising the same. As shown, each pile-up assembly also includes a plurality of long contact carrying lever springs 31, 31*a*, and 31*b* which are held apart at their outer ends by cylindrical insulator blocks 32 carried dependingly from the outer ends of such springs so that the elevation of the lower lever spring 30 of each pile-up assembly serves likewise to elevate the correspondingly similar long lever springs of the particular pile-up assembly engaged by the roller. Each pileup also includes a plurality of short contact leaf springs 33, 33*a*, 33*b* and 33*c*; a plurality of spaced rigid metal finger bars 34 and a plurality of spacer blocks 35 made of insulating material. The assembly is such that each of the long springs 30, 31, 31*a* and 31*b* cooperates with an overlying one of the short leaf springs 33, 33*a*, 33*b*, 33*c* (see Figure 4) with a finger bar 34 lying in adjacent contact with each of the short springs, but insulated from the long springs by an interposed insulated block member 35; the blocks 35 being located at one end of each pile-up assembly and held in place by screw means 36, 36 so that each pile-up is a separate assembly with the spring elements thereof supported in cantilever manner between the pileup of the insulator blocks 35.

Each of the short springs (33, *a*, *b*, *c*, etc.) is equipped with a pair of contacts 37 adjacent its outer end which register with a corresponding pair of contacts 38 carried by a related long spring 30, 31, 31*a*, or 31*b* as the case may be. The several contact carrying springs 30, 31, 31*a*, 31*b* and 33, 33*a*, 33*b*, 33*c* terminate beyond the insulator spacer blocks 35 in terminal connector tabs 39, 40, respectively, suitable for soldered connection with circuit leads (see Figures 2, 9*a*, 9*b*, 10*a*, 10*b*).

The switch 10 as illustrated in Figures 1–4 has three pile-up assemblies 11, 12 and 13, each containing four sets of contacts 37—38 for actuation by the roller member 22. It will be recognized that the switch may include one pile-up, two pile-ups or three pile-ups etc., with a variation in the number of contact sets per pile-up including a single set per pile-up and a variety of contact arrangements, such as make, break and transfer as desired. No matter how the switch is equipped, only one pile-up is actuated at one time by the roller means 22. If only two pile-ups are employed, for example, the operating handle member 20 has two pile-up actuating positions and one off position; the latter position of which may constitute any one of three operational positions for the handle 20.

With regard to the operating positioning of the handle member 20, it will be seen that the attached bar 16 is equipped with a detent projection 41 depending from its lower face which is designed to be received in each of three arcuately spaced openings 42 formed in the platform portion 14 of the frame. In each operating position for the operating bar, the same is locked when the projection member 41 enters one of the openings 42 of the platform portion. The pivotal rivet 18 is so arranged as to normally bias the operating bar toward the platform portion of the frame. Thus to operate the handle and operating bar 16 the operator must first lift the handle 20 upwardly away from the platform portion 14 and move the handle and bar 16 sideways to a selected or desired operating position for the roller. The stop pin members 24, 25, extending upwardly from the upper face of the platform portion 14, of course, serve to limit the sidewise or arcuate movement of the operating bar.

As an illustration of one use for the three pile-ups switch illustrated in Figures 1 through 4 of the drawings, the same may be used to selectively insert three different resistance networks into a loop dial trunk repeated circuit. Another illustration showing its versatility of use can be found when the switch 10 is equipped with only two pile-ups whereby the same can be used in a selector link circuit to adapt the selector as indicated below (the manually operated handle being in the positions indicated):

| Handle Position | Operation |
|---|---|
| Position 1S (pile-up 11') | operation as a first selector. |
| Off Position TS | operation as an incoming trunk selector. |
| Position 2S (pile-up 13') | operation as a second selector. |

*Selector circuit adapted for use as a first selector*

Figure 9A:
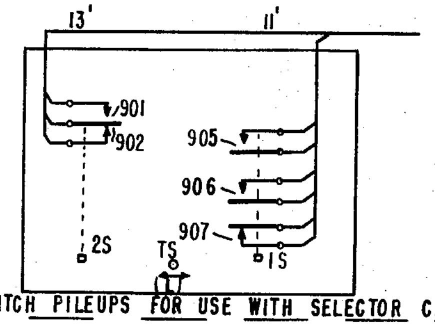
Figure 9B:
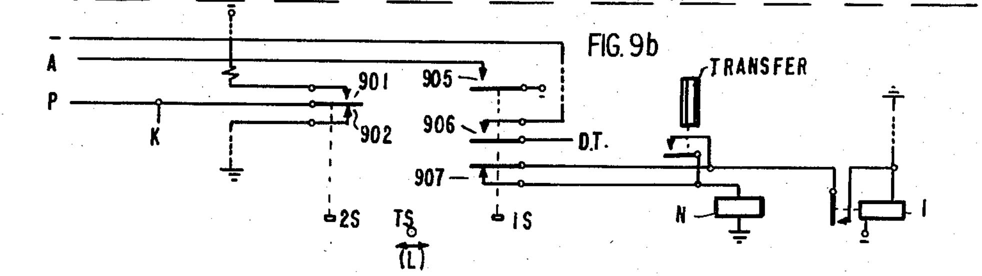

With reference to Figures 9*a* and 9*b* (which should be considered one above the other) it will be observed that the manually operable switch when connected for use with a selector switch will comprise a lever operable to a first pile-up position 1S to operate pile-up, 11' to a second position TS having no pile-up, and to a third pile-up position 2S to operate pile-up 13'.

It will be apparent with reference to Figure 9*b* that as the switch lever is moved to the first position to actuate the pileup 11', the selector will be adapted for use as a first selector. Briefly, in such position the transfer contacts 901—902 associated with the pile-up 13' which is non-actuated by the roller will be such that contacts 902 effect connection of the incoming "P" wire to supervisory ground. Such connection is, of course, incident to the fact that first selectors are tied back to back to associated linefinders, and links comprising linefinders and associate first selectors are selected by utilizing the "A" (allotter) conductor, rather than the "P" wire.

The manually operable switch at its contacts 905 directs battery to the allotter conductor "A" indicating that the selector of the link is in the idle condition, and at its closed contacts 906 directs dial tone to the negative wire to notify the calling party that dialling may begin. It is apparent that when used as a first selector, the first digit dialled will be received by the selector switch, and accordingly, dial tone is appropriate at this stage. Contacts 907 are opened whereby the circuit for locking the counting chain relay 1 in series with the associated sequence relay N is held open whereby the counting chain relay 1 may release when its original energizing circuit and the locking circuit through contacts of this transfer relay are opened. In this manner preliminary impulse cancellation is provided, should an unwanted preliminary impulse arrive in the selector as a result of switch hook jiggling or any other like cause. Such arrangement is appropriate when the switch is used as a first selector inasmuch as the first digit dialled is registered therein.

It is apparent to parties skilled in the art that with the operating of the switch lever to position 1S, the selector switch is adapted for use as a first selector unit.

*Selector circuit adapted for use as a second selector*

In the event that the operating lever of the manually operable switch is moved to the illustrated position 2S, the contacts of pile-up 13' are actuated, and the contacts of pile-up 11' are restored to condition the switch for use as a second selector. That is, as the pile-up 13' is operated, transfer contacts 901 of pile-up 13' are closed to direct the incoming "P" wire to resistance battery, it being prior art practice in arrangements in which a second selector is accessed from a first selector to present resistance battery to the incoming test wire as an indication of an idle second selector.

It should be understood that when the second selector is seized that the resistance battery circuit is disconnected in the selector, and the incoming "P" wire is grounded via the conductor K independently of the manually operable key contacts 901, whereby the second selector is indicated as busy to any of the first selectors which may be testing.

Contacts 905 of pile-up 11′ at this time are in the open position, and battery will be withheld from the link allotter conductor "A"; contacts 906 are in the open position to withhold dial tone from the incoming negative conductor; and the contacts 907 are closed whereby preliminary impulse cancellation is disabled, and the first level of the selector is made available to the incoming equipment.

It is apparent from the foregoing description that with movement of the switch lever to position 2S, the selector circuit is adapted for use as a second selector.

*Selector circuit adapted for use as an incoming trunk selector*

In the event that the lever is moved to the central position identified as TS in Figure 9*a*, the selector switch will be adapted for use as an incoming trunk selector. Specifically, it will be apparent that the contacts 901 of the pile-up 13′ will be open and contacts 902 of the pile-up will be closed, whereby the incoming "P" wire is directed to supervisory ground instead of resistance testing battery, this being the conventional arrangement in stages in which no testing is necessary (the selector in this case being tied directly to the incoming trunk).

With reference to the pile-up 11′, it will be apparent that the contacts 905 whereby a battery is connected to the link allotter conductor "A," will be in the open condition. It is, of course, apparent that allotting will not be necessary whenever the incoming trunk is tied directly to the selector. It will also be apparent that the contacts 906 of pile-up 11′ will be open, and dial tone will be withheld from the negative conductor. Such arrangement is consistent with the use of the switch as an incoming trunk selector, in that the calling party will dial the first digit of the called number into, and will receive dial tone from, the preceding equipment in the arrangement.

Contacts 907 will be closed and the circuit will be maintained to allow the counting chain relay 1 to remain locked in series with its associated sequence relay N when the original energizing circuit of the counting chain relay 1 is open even though the transfer relay has released. In such manner preliminary impulse cancellation is disabled, and the number one level of the selector is available for the establishment of connections.

It is apparent from the foregoing description that the manually operable switch readily adapts a single circuit for use alternatively as an incoming trunk selector, a second selector, or a first selector. It is also apparent that the inclusion of a simple manually operable switch in a switching circuit in this manner makes possible the utilization of a single circuit in numerous exchange applications, and thereby presents increased exchange flexibility at a minimum cost.

The manually operable switch may also be utilized with a connector circuit to adapt the circuit for use as an incoming trunk connector, for use back to back with a linefinder to provide a linefinder-connector link, and for use where there is shown thereat the manner in which the pile-ups 11′ and 13′ would be constituted to provide such arrangement. As shown thereat the pile-up 11′ comprises break make contacts 1004, 1005, break contacts 1006 and break contacts 1007. The pileup 13′ comprises make contacts 1001, make contacts 1002 and break contacts 1003. The middle position of the switch will be without a pile-up.

Figure 10A:
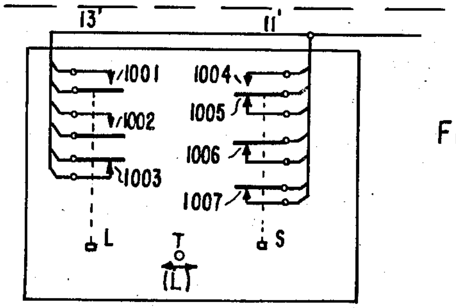
Figure 10B:
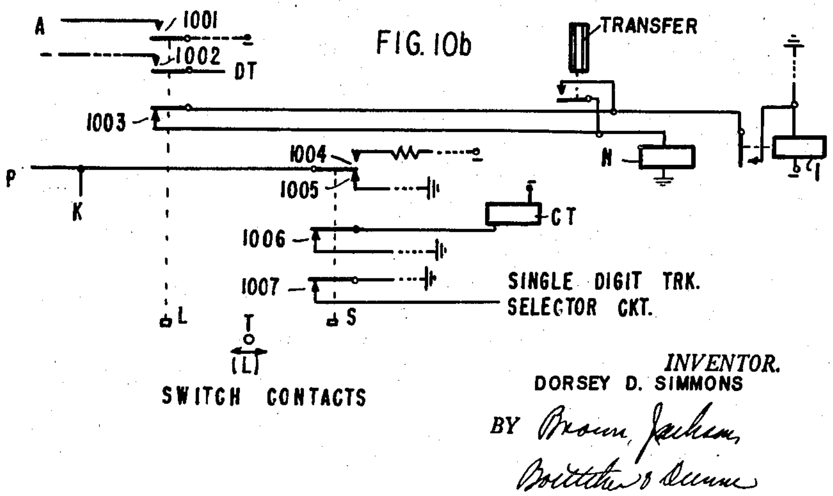

With reference to Figure 10*b* the manner of the connection of the contacts of the pile-up in the connector switch are illustrated thereat. The manner in which the contacts are operative to condition the connector switch for operation in the various indicated applications will now be described.

| Handle Position | Operation |
|---|---|
| Position S (pileup 11′) | operation in conjunction with a regular local selector. |
| Off-position T | operation for use as an incoming trunk connector. |
| Position L (pileup 13′) | operation in conjunction with a linefinder. |

*Conditioning connector circuit for use as an incoming trunk connector*

With the operation of the lever to the center position (T) illustrated in Figure 10*a* it will be apparent that the contacts of pile-ups 11′ and 13′ will be in the condition shown. In this position the switch circuit will be adapted for use as an incoming trunk connector. Briefly, contacts 1001 are open and battery is withheld from the allotter conductor "A," it being apparent that allotting in the case of an incoming trunk connector is unnecessary. Contacts 1002 of the pile-up 13′ are open to disconnect dail tone from the negative conductor, in that dial tone will be supplied to the calling party by the switch in a preceding stage of the switching arrangement.

Contacts 1003 of pile-up 13′ are closed and a circuit is thereby prepared for the holding circuit for the first counting chain relay 1 to permit locking thereof in series with its associated sequence relay N whereby the connector switch will be without preliminary impulse cancellation. It is apparent, of course, that the first digit dialled will be received by an earlier switch in the switching connection, and accordingly such protection is not needed at this stage.

Contacts 1004 will be open and contacts 1005 will be closed whereby supervisory ground is directed to the incoming "P" wire and resistance testing ground is withheld therefrom. Contacts 1006 of pile-up 11′ prepare a circuit for the cut-through relay CT causing the positive and negative conductors (not shown) to be cut through on a call to a trunk. Calling substation talking battery is now supplied by the called trunk, the cut-through relay in operating effecting extension of the positive and negative condutcors to the trunk independent of condensers and connector talking batteries and coils.

Contacts 1007 of pile-up 11′ are closed and ground is provided for single digit trunk selection in the conventional manner.

It is apparent therefore, that the single switch member in the T position will adjust the connector circuit for use as an incoming trunk connector.

*Connector circuit adapted for use in linefinder-connector link*

With operation of the lever to the position identified by the legend L in Figure 10*a* the pile-up 13′ is operated and the connector is conditioned for back-to-back use with a linefinder switch thereby providing a linefinder-connector link. Specifically, contacts 1001 of pile-up of 13′ are closed to connect battery to allotter conductor "A" to indicate to the allotter at the appropriate times that the link is idle. Contacts 1002 of pile-up 13′ are closed to prepare for extension of dial tone to the calling subscriber as required, it being obvious that a connector in a linefinder-connector link receives the first digit dialled.

Contacts 1003 of pile-up 13′ are opened so that the first digit circuit for counting chain 1 which normally operates in series with its assoicated sequence relay N may be opened. Thus, in the event that a preliminary impulse is received, the first counting chain relay can release to cancel the pulse and prevent false switch operation.

With reference to pile-up 11′ it will be apparent that contacts 1004 will be open, and contacts 1005 will be closed, whereby ground is prepared for the "P" wire test conductor and resistance testing battery is withheld inasmuch as the link is not tested for seizure over the "P" wire test conductor in such arrangement but is rather allotted over the "A" conductor. Contacts 1006 will be closed and a circuit will be prepared for cut-through relay CT in the event of a call to a trunk. Contacts 1007 of the pile-up 11′ will be closed and ground is prepared for single digit trunk selection in the conventional manner.

It is apparent from the foregoing description that the switch in a second position (L) adapts the connector for use as a connector in a linefinder-connector link.

*Connector circuit adapted for use with a preceding selector*

With the manually operable switch lever in the position indicated at S in Figure 10*a*, the connector is adapted for use with a preceding selector. Specifically, contacts 1001 of the pile-up 13′ will be opened, and battery will be withheld from the allotter conductor "A," whereby the connector may be tested for seizure by a preceding selector in the conventional manner. Contacts 1002 of pile-up 13′ are open, and dial tone is withheld from the negative conductor, inasmuch as the first digit is received by a switch in a preceding stage of the connection. Contacts 1003 of the pile-up 13′ are maintained closed so that preliminary impulse cancellation is disabled, and counting chain relay 1 will be permitted to hold operated in series with associated sequence relay N when the link transfer relay releases following receipt of the first digit.

With reference to pileup 11′, it is apparent that contacts 1004 will be closed and 1005 will be open whereby the incoming "P" wire is transferred to resistance battery to indicate to preceding testing selectors that the connector is idle. Once the connector is busy, ground will be connected to the "P" wire via conductor K and resistance battery will be disconnected in conventional manner.

Contacts 1006 of pile-up 11′ will be open to interrupt the circuit of the cut-through relay CT in that no trunks requiring cut-through are accessed via the connector when used with a preceding selector. Contacts 1007 are opened to interrupt the single digit trunk selection circuit in that the single digit trunks are accessed at a prior stage in the arrangement.

It is apparent from the foregoing description that with the use of the manual operable switch according to the preceding disclosure a single connector switch may be adapted for use in three different applications by the mere manual operation of a switch lever between three preassigned positions. The advantages of such arrangement and the reduction in the amount of equipment achieved through such arrangement are readily apparent.

A still further example for the use of such a two pile-up switch is to be found in an allotter circuit, to adapt the allotter as follows with the manually operated handle in the positions indicated.

| Handle Position | Operation |
|---|---|
| pile-up one-position | operation as the first of two allotters. |
| pile-up two-position | operation as the second of two allotters. |

The center position in this example will normally be left vacant for this type of allotter operation.

Combinations of various positions of two or more manually operable switches connected for joint operation are also available in effecting certain of the foregoing uses, as well as other operations not specifically mentioned hereinabove.

It will, of course, be understood that terminal tabs 39—40 protruding from the rear of the pile-up assemblies 11, 12 and 13 respectively, serve to connect the same assemblies individually to various circuits as desired.

Figures 5 through 8 of the drawings illustrate another form of the invention, a switch 50 having the general nature and operational characteristics described for the switch 10 illustrated in Figures 1 through 4 of the drawings with certain modifications. The modified switch 50 comprises a device having two pile-up assemblies 51 and 52 and in place of a third pile-up as used in the switch of Figure 1, an indicator lamp assembly 53. Lamp assembly 53 is provided with a pair of connecting lugs or terminals 54, 54 at one end. The two pileup assemblies 51 and 52 each include plural long flexible leaf spring-type contact carrying members 55, 55, corresponding plural short spring-type contact carrying members 56, 56, rigid spacer bars 57, 57 and insulator spacer blocks 58, 58, all assembled in vertical stacked array according to conventional practice and attached or fixed adjacent one end and atop of a platform portion 59 of a relay-type frame member 60 as in my first described device. The lamp assembly 53 is also mounted on the platform portion 59 in side-by-side spaced parallelism with the two pile-up assemblies 51, 52. Each of the contact carrying spring members 55 and 56 terminates beyond the spacer blocks 58 in a terminal connector tab or ear 61. Particular notice should be taken of the arrangement of the lowermost springs **55*a* and 56*a* wherein it will be understood that spring 56*a* is disposed beneath the longer spring 55*a*. By this means raising or flexing of the longer spring 55*a* causes a separation of the contacts carried thereby from the contacts carried by spring 56*a* as opposed to the reverse action which takes place between corresponding springs in the switch 10** of Figure 1.

An operating arm 62 pivoted by rivet 63, as before, is provided beneath the pile-up assemblies 50 and 51 on the upper face of the platform portion 59. Such operating bar carries a roller member 64 adjacent its outer end rotatably carried by an operating handle member 65. A detent projection 66 protrudes from the lower face of the operating bar for engagement with spaced position opening 67 formed in the platform portion 59, and the bar or arm 62 works against stop pins 69 and **69*c* as in the first described switch 10**.

Figures 5, 6:
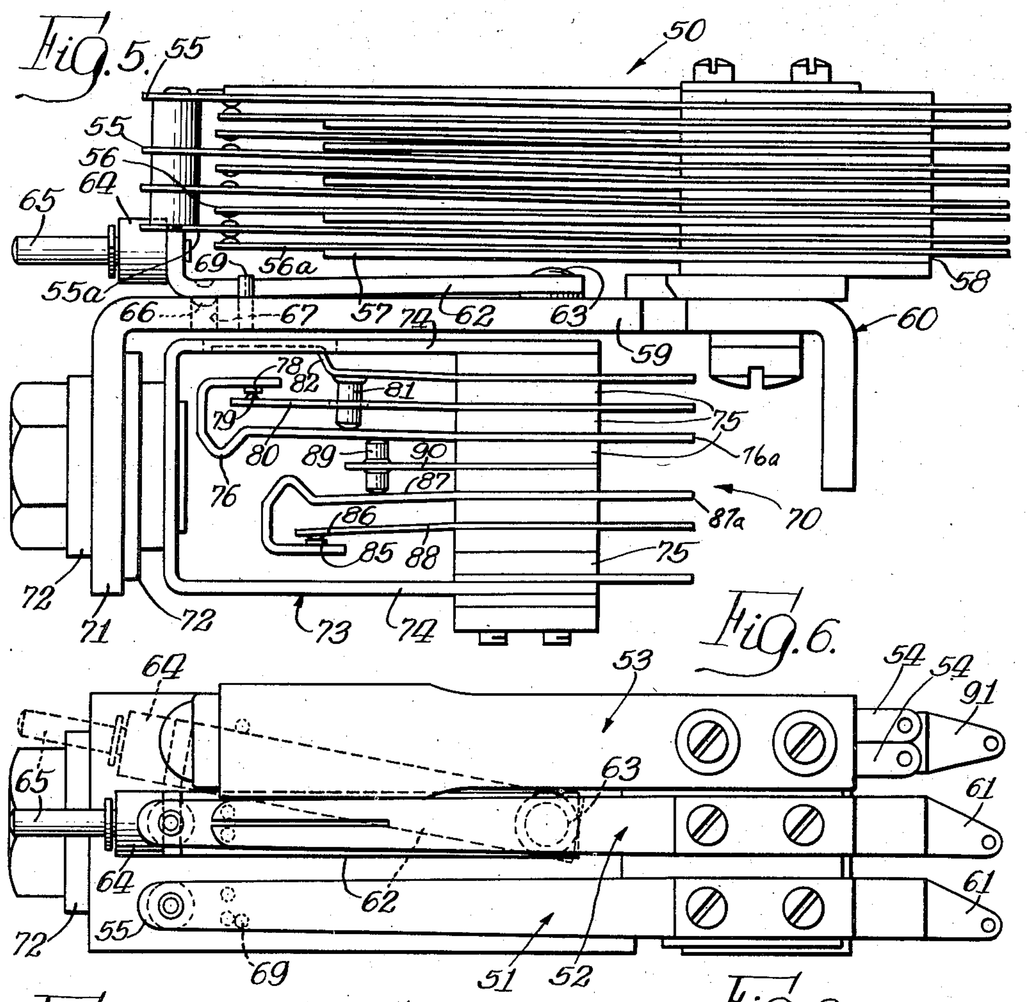
Figure 5 is a side elevation view, similar to Figure 1, showing the features of a modified form of my improved switch.
Figure 6 is a top plan view of the modified switch of Figure 5.
Figure 7:
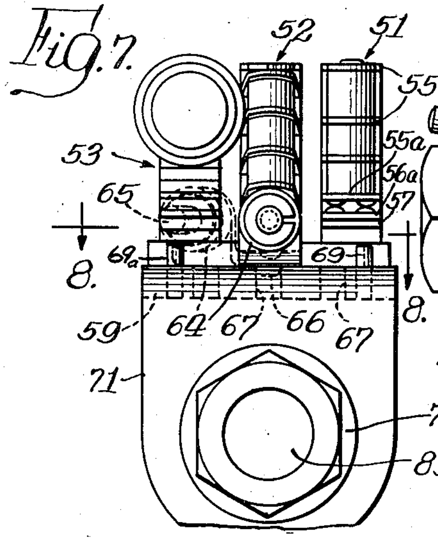
Figure 7 is a view in end elevation looking at the left hand end of the switch as shown in Figure 5.
Figure 8:
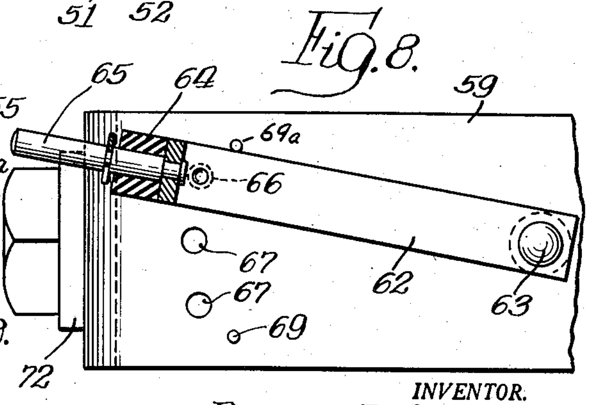
Figure 8 is a partial cross-sectional view, taken substantially at line 8—8 of Figure 7, to show especially the details of the locking means used for positioning the pile-up actuating roller employed in both forms of my switch illustrated.

The major distinction of the Figure 5 device over that illustrated in Figures 1 through 4 of the drawings, resides first in the replacement of one pile-up assembly with the indicator lamp means 53. Such lamp has its connector terminals 54, 54 adjacent the rear end of the pile-up assemblies for connection to points in an associated link circuit so that the lamp is lighted when the link is busy or energized.

The second major distinction in the Figure 5 device resides in the provision of a plug-in type jack assembly, indicated generally at 70. This jack assembly is placed in the position normally occupied by a relay coil associated with relay frame 60. To accommodate this jack assembly a depending wall portion 71 of the relay frame is provided with a round aperture for mounting a plug receiving ring assembly 72.

This ring assembly supports a bracket member 73 of a substantially U-shaped configuration having vertically spaced arm portions 74, 74 adjacent and between the outer ends of which are stacked a plurality of substantially square-shaped insulator block members 75. Such block members 75 serve to hold and separate related contact arms of two jack plug engaging contact assemblies; the upper one of which comprises, for example, an elongated upper contact arm 76 having a contact member 78 adjacent its outer end for engaging a registering contact 79 carried by an intermediate spring contact arm 80. This intermediate contact arm 80 is provided with an aperture or opening for the passage of an insulated finger member 81 carried dependingly from an upper leaf spring arm 82. All of the arm members of each contact assembly for the jack are of resilient spring-like material as such are biased resiliently by the insertion of a jack plug (not shown) through the opening 83 provided by the annular connector ring means 72 conventional to jack assemblies. For example, upon the insertion of a jack plug into the jack assembly, the contact arm 76 is biased upwardly so that contacts 78 and 79 are separated with the finger 81 causing a resilient compression of the upper leaf spring arm 82 thereby to insure good engagement of the contact arm 76 with the jack plug.

Similarly, a lower contact assembly has a lower set of contacts 85 and 86 associated respectively with a long lower contact carrying arm 87 and a short contact arm 88; such lower contact assembly being separated from the upper contact assembly by an insulated spacer finger 89 carried by a resilient spacer arm 90 held at one end between blocks 75.

In the present intended use of this equipment, contacts 78, 79, 85 and 86 are not used for circuit connection. The terminal ends **76*a* and 87*a* of arm members 76 and 87** respectively, provide means for tapping equipment associated with the device into a telephone link circuit.

The jack assembly is connected by wires soldered to terminals **76*a* and 76*b* extending to and soldered to two terminal plates 91, 91 mounted above the platform 59 and carried and insulated from each other by the insulator blocks 58 beneath the lamp assembly 53. Such terminal plates 91 are positioned so as not to interfere with the operation of the operating lever 62** and are designed to be connected via interconnecting wires and the like to the tip and ring or + and — conductors of an associated link for monitoring, dialling, and testing purposes.

Each of the pile-up assemblies 51 and 52 of the modified form of switch 50 bear the terminal connectors 61, 61, as mentioned, which may be interconnected with various points in an associated link circuit.

A typical example of operating my modified form of switch 50 is as follows with the manually operated handle and operating arm being set in the positions indicated:

| Handle Position | Operation |
|---|---|
| pile-up one position | battery connected to link; normal operation of link by subscribers. The lamp 53 goes on and off accordingly as the link is busy or idle. When the lamp is lighted the test man is thus notified that the link is busy. |
| pile-up position | battery connected to link, but allotter is stepped or link is made artificially busy to subscribers so that tester can test. Tester inserts plug in jack, his cord circuit engages the link, lighting the lamp, showing that the link is actually busy. |
| off-position | battery removed from link to take link out of service. |

With regard to this modified form of device it will be appreciated that the indicator lamp means 53 may be omitted if desired.

From the foregoing description it will be understood that I have herein described and set forth the details and concepts of a preferred and first modified form of improved manually operable selector switch having special utility in association with telephone control systems and the like. Further, it will be understood that while numerous changes, modifications and substitutions of equivalents can obviously be made in carrying out this invention, such will nevertheless fail to depart from its spirit and scope. As a consequence, it is not my intention that I be limited to the particular features and form of devices illustrated and described except as may appear in the following appended claims.

I claim:

1. In a selector switch for use in a telephone exchange, a first control circuit for adapting said selector switch for operation as an incoming trunk selector switch in an exchange, a second control circuit for adapting said selector switch for operation as a first selector switch in an exchange, and a switch member having selector means operative to a first position to render said first control circuit effective, and operable to a second position to render said second control circuit effective.

2. A selector switch as set forth in claim 1 which includes a third control circuit for adapting said selector circuit for operation as a second selector in an exchange, and in which said switch member is operable to a third position to render said third control circuit effective.

3. In a selector switch for use in a telephone exchange, a first control circuit for adapting said selector switch for operation as an incoming trunk selector switch in an exchange, a second control circuit for adapting said selector switch for operation as a second selector switch in an exchange, and a switch member having selector means operative to a first position to render said first control circuit effective, and operable to a second position to render said second control circuit effective.

4. In a selector switch for use in a telephone exchange, a first control circuit for adapting said selector switch for operation as a second selector switch in an exchange, a second control circuit for adapting said selector switch for operation as a first selector switch in an exchange, and a switch member having selector means operative to a first position to render said first control circuit effective, and operable to a second position to render said second control circuit effective.

5. In a connector switch for use in a telephone exchange, a first control circuit for adapting said connector switch for operation in a linefinder connector link in an exchange, a second control circuit for adapting said connector switch for operation as an incoming trunk connector switch in an exchange, and a switch member having selector means operative to a first position to render said first control circuit effective and operable to a second position to render said second control circuit effective.

6. A connector switch as set forth in claim 5 which includes a third control circuit for adapting said connector switch for use with a preceding selector switch in the exchange, and in which said switch member is operable to a third position to render said third control circuit effective.

7. In a connector switch for use in a telephone exchange, a first control circuit for adapting said connector switch for operation as an incoming trunk connector switch in an exchange, a second control circuit for adapting said connector switch for operation with and accessible to a selector switch in an exchange, and a switch member having selector means operative to a first position to render said first control circuit effective, and operable to a second position to render said second control circuit effective.

8. In a connector switch for use in a telephone exchange, a first control circuit for adapting said connector switch for operation in a linefinder-connector link in an exchange, a second control circuit for adapting said connector switch for operation with and accessible to a selector switch in an exchange, and a switch member having selector means operative to a first position to render said first control circuit effective, and operable to a second position to render said second control circuit effective.

9. A selector switch for use in a telephone exchange comprising a first control circuit for adapting said selector switch for operation as a switch in one stage of an exchange, a second control circuit for adapting said switch for operative connection at another stage in the exchange, and a switch member manually operable to different positions to selectively render the different control circuits effective separately and thereby adapt the switch for operation in said different stages.

References Cited in the file of this patent

UNITED STATES PATENTS

| | | |
|---|---|---|
| 2,019,807 | Brown et al. | Nov. 5, 1935 |
| 2,351,236 | Smiley et al. | June 13, 1944 |
| 2,491,377 | Joel | Dec. 13, 1949 |
| 2,512,908 | Arndt | June 27, 1950 |
| 2,667,539 | Kessler et al. | Jan. 26, 1954 |